(12) United States Patent
Stamps et al.

(10) Patent No.: US 9,126,680 B2
(45) Date of Patent: Sep. 8, 2015

(54) DUAL MODE ROTOR HUB ASSEMBLY

(75) Inventors: Frank B. Stamps, Colleyville, TX (US);
Patrick Tisdale, Roanoke, TX (US);
John J. Corrigan, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 622 days.

(21) Appl. No.: 13/298,033

(22) Filed: Nov. 16, 2011

(65) Prior Publication Data
US 2013/0121827 A1 May 16, 2013

(51) Int. Cl.
*B64C 27/51* (2006.01)
*B64C 27/635* (2006.01)
*B64C 29/00* (2006.01)

(52) U.S. Cl.
CPC .............. *B64C 27/51* (2013.01); *B64C 27/635* (2013.01); *B64C 29/0033* (2013.01); *Y10T 29/49332* (2013.01)

(58) Field of Classification Search
CPC ......... F16D 57/02; F16D 57/04; B64C 27/51; B64C 27/605; B64C 27/635; B64C 29/0033
USPC ....... 416/98, 103, 106, 131, 134 A, 135, 140, 416/500; 188/293, 294; 280/124.177
See application file for complete search history.

(56) References Cited

U.S. PATENT DOCUMENTS

| 2,774,553 | A |   | 12/1956 | Jensen et al. |   |
|---|---|---|---|---|---|
| 3,134,444 | A | * | 5/1964 | Egerton et al. | 416/24 |
| 4,768,630 | A |   | 9/1988 | Aubry et al. |   |
| 4,795,310 | A | * | 1/1989 | McArdle et al. | 416/134 A |
| 5,501,434 | A | * | 3/1996 | McGuire | 267/140.11 |
| 6,889,965 | B2 | * | 5/2005 | Loftus et al. | 267/136 |
| 7,931,258 | B2 | * | 4/2011 | Russell et al. | 267/219 |
| 2004/0126238 | A1 | * | 7/2004 | Scala | 416/98 |
| 2008/0247876 | A1 |   | 10/2008 | Stamps |   |
| 2009/0218443 | A1 |   | 9/2009 | Wereley et al. |   |
| 2010/0230529 | A1 | * | 9/2010 | Stamps et al. | 244/17.11 |
| 2011/0155841 | A1 | * | 6/2011 | Cranga et al. | 244/17.11 |
| 2011/0236209 | A1 |   | 9/2011 | Louis et al. |   |

FOREIGN PATENT DOCUMENTS

| CA | 2533201 | 3/2005 |
|---|---|---|
| WO | 2005021990 | 10/2005 |

OTHER PUBLICATIONS

Sikorsky H-34 (S-58) Choctaw (http://www.b-domke.de/AviationImages/Rotorhead/8987.html ), Mar. 28, 2007 (Courtesy of the WayBack Machine, http://archive.org/web/), Aviation Images (http://www.b-domke.de/AviationImages.html).*

(Continued)

*Primary Examiner* — Edward Look
*Assistant Examiner* — Danielle M Christensen
(74) *Attorney, Agent, or Firm* — James E. Walton

(57) ABSTRACT

A rotor hub assembly and method for controlling movement of a rotor blade relative to a swashplate. The hub assembly having an attachment device operably associated with the rotor blade and the swashplate. The attachment device provides pivot and rotational blade movement relative to the swashplate. A dual spring-rate damper is operably associated with the attachment device. The damper switches between a first spring rate and a second spring rate during flight to control movement of the rotor blade. The method includes the process of switching the damper between the first spring rate and the second spring rate during flight.

10 Claims, 6 Drawing Sheets

(56) References Cited

OTHER PUBLICATIONS

European Search Report dated Nov. 7, 2012 from counterpart EP App. No. 12175816.3.
European Search Report dated Nov. 27, 2013 from counterpart EP App. No. 12175816.3.
European Search Report dated Nov. 17, 2013 from counterpart EP App. No. 11195396.4.
Office Action dated Apr. 9, 2014 from counterpart CA Appl. No. 2,794,039.
Office Action dated Sep. 15, 2014 from counterpart CN App. No. 2012104092840.
Office Action dated Jul. 21, 2014 from counterpart EP App. No. 11195396.4.
Canadian Office Action dated Feb. 17, 2015 from counterpart CA App. No. 2794039.
Office Action dated May 11, 2015 from counterpart CN App. No. 201210409284.0.

* cited by examiner

DUAL MODE ROTOR HUB ASSEMBLY

BACKGROUND

1. Field of the Invention

The present application relates generally to rotor hub assemblies, and more particularly, to a rotor hub assembly having a damper.

2. Description of Related Art

Conventional rotor hub assemblies are well known in the art for effectively controlling directional movement of a rotary aircraft. Articulated hub assemblies include two or more rotor blades that flap, feather, lead, and lag independently of each other. The hub assemblies typically include a horizontal hinge, called the flapping hinge, which allows the blade to move up and down. This movement is called flapping and is designed to compensate for dissymmetry of lift. The vertical hinge, called the lead/lag or drag hinge, allows the blade to move back and forth. This movement is called lead/lag, dragging, or hunting.

Conventional rotor hub assemblies typically include dampers operably associated with the horizontal and/or vertical hinge. The damper compensates for the acceleration and deceleration created by the rotor during flight. Specifically, the damper is configured to absorb the forces of the rotor blades and to maintain the frequency of the lead/lag motion within a desired range.

Conventional dampers include a single damping ratio, which is an undesired during different flight conditions. For example, the spring rate chosen for a lead/lag damper is a compromise between the value required for the desired in-plane stiffness and a value that reduces load and fatigue on the rotor and other aircraft components.

Although great strides have been made in rotor hub assemblies, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

Figure 1:
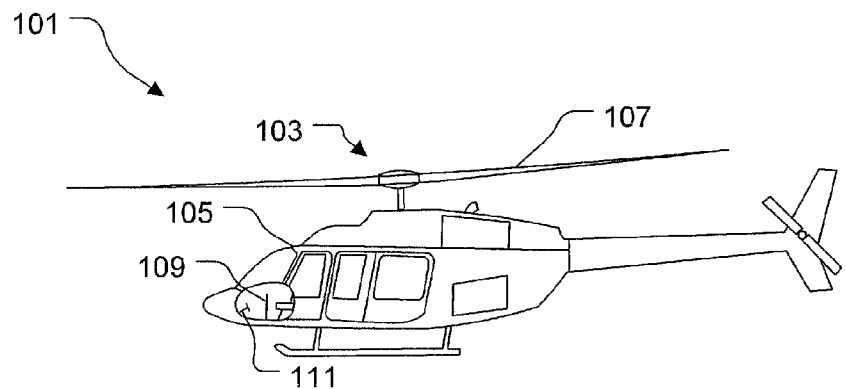
FIG. 1 is a side view of a rotary aircraft utilizing a rotor hub assembly of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the hub assembly and method are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The rotor hub assembly of the present application overcomes common disadvantages associated with conventional assemblies. In particular, the hub assembly provides effective means for controlling centrifugal forces, flapping, feathering, and lead/lag movement of the rotor blades during flight. The assembly includes an attachment device, hereinafter interchangeably referred to as a "trunnion," that pivotally and rotatably attaches the rotor blades to the swashplate. A dual spring-rate damper operably associated with the trunnion allows selective switching between two or more spring rates during flight. These features provide effective means for controlling centrifugal forces, flapping, feathering, and lead/lag motions created by the rotor blades during flight.

The assembly and method of the present application will be understood, both as to its structure and operation, from the accompanying drawings, taken in conjunction with the accompanying description. Several embodiments of the assembly are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise.

Figure 2:
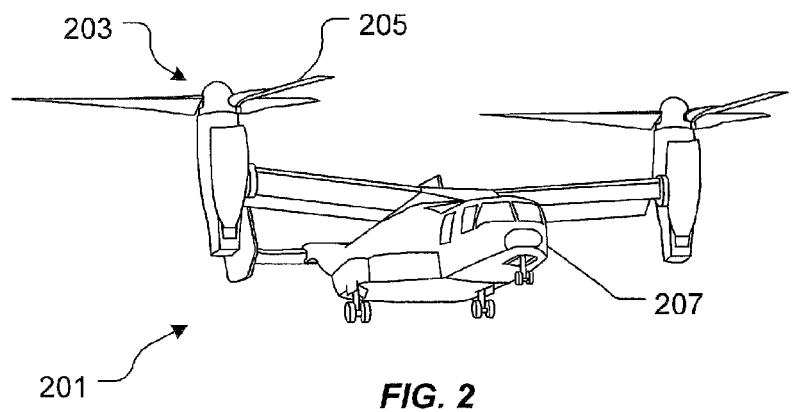
FIG. 2 is an oblique view of a tiltrotor aircraft utilizing the rotor hub assembly of the present application.

Referring now to the drawings wherein like reference characters identify corresponding or similar elements throughout the several views, FIGS. 1 and 2 show two different rotary aircraft utilizing the rotor hub assembly of the present application. FIG. 1 shows a side view of a helicopter 101, while FIG. 2 shows an oblique view of a tiltrotor aircraft 201. The rotor hub assembly is preferably used with rotary aircraft; however, it will be appreciated that the features disclosed herein are easily adapted for use with other types of vehicles and/or machinery.

Helicopter 101 comprises a rotor hub assembly 103 carried by a fuselage 105. One or more rotor blades 107 operably associated with rotor hub assembly 103 provide flight for helicopter 101 and are controlled with a plurality of controllers within fuselage 105. For example, during flight a pilot can manipulate the cyclic controller 109 for changing the pitch angle of rotor blades 107 and/or manipulate pedals 111, thus providing vertical, horizontal, and yaw flight movement.

Tiltrotor aircraft 201 includes two or more rotor hub assemblies 203 carried by rotatable nacelles. The rotatable nacelles provide means for allowing aircraft 201 to takeoff and land like a conventional helicopter and for horizontal flight like a conventional fixed wing aircraft. It should be understood that, like helicopter 101, tiltrotor aircraft 201 is provided with controls, e.g., cyclic controllers and pedals, for controlling movement of the aircraft.

Figure 3:
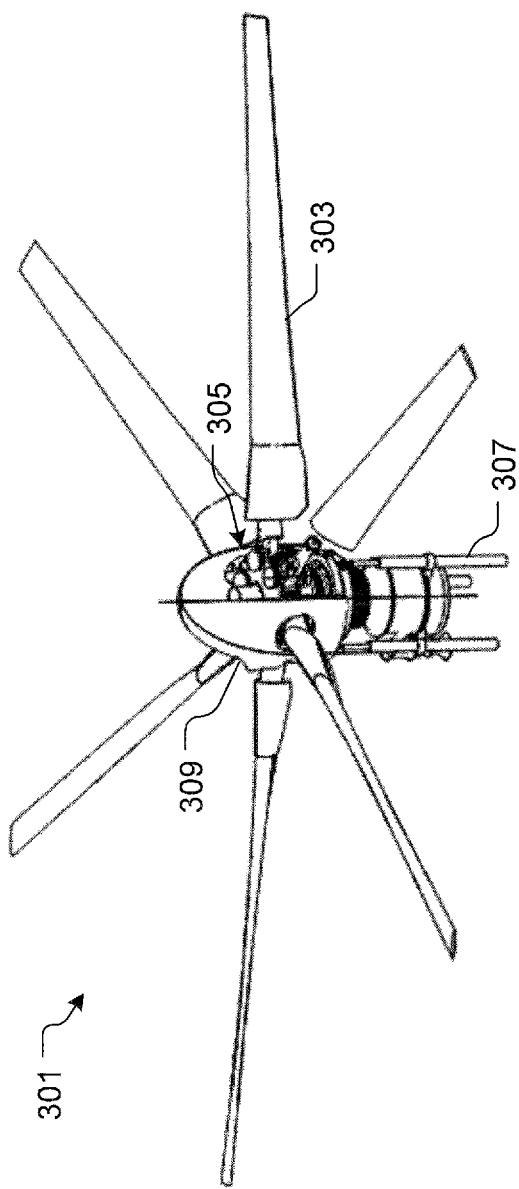
FIG. 3 is an oblique view of the rotor hub assembly of the present application.

FIG. 3 depicts an oblique view of the rotor hub assembly according to the preferred embodiment of the present application. Rotor hub assembly 301 efficiently controls movement created by the rotor blades, for example, lead/lag, centrifugal forces, feathering, and flapping. It should be understood the both rotor hub assemblies 103 and 203 discussed above include the features of rotor hub assembly 301. Thus, it should be understood that the features of rotor hub assembly 301 disclosed herein are incorporated in assemblies for helicopters, tilt rotor aircraft, and other types of rotary aircraft, and including vehicles, and/or other types of machinery.

Rotor hub assembly 301 comprises at least two rotor blades 303 operably associated with a swashplate 305. During operation, an aircraft engine (not shown) drives rotor blades 303, while swashplate 305 controls movement of rotor blades 303. In the exemplary embodiment, rotor hub assembly 301 includes six rotor blades 303, which rotate along axis A1; however, it will be appreciated that the rotor hub assembly could include more or less rotor blades, depending on the preferred application. Rotor hub assembly 301 also includes one or more control links 307 operably associated with swashplate 305 for controlling movement of rotor blades 303. It should be understood that the control links are controlled with one or more of the controllers and/or control systems discussed herein. A housing 309, e.g., a spinner, is utilized to protect swashplate 305 and other components of rotor hub assembly 301. In the preferred embodiment, assembly 301 is an articulated rotor hub assembly, which allows the rotor blades to move independently; however, it will be appreciated that the features of assembly 301 could easily be incorporated in other types of hub assemblies, including non-articulated assemblies.

For ease of description, not all of the required subsystems and devices operably associated with rotor hub assembly 301 are shown. For example, the necessary sensors, connectors, power sources, mounting supports, circuitry, software, control systems, and so forth are not all shown in order to clearly depict the novel features of the rotor hub assembly. However, it should be understood that the rotor assembly disclosed herein is operably associated with these and other required systems and devices for operation, as conventionally known in the art, although not discussed and depicted in the drawings.

Figure 4:
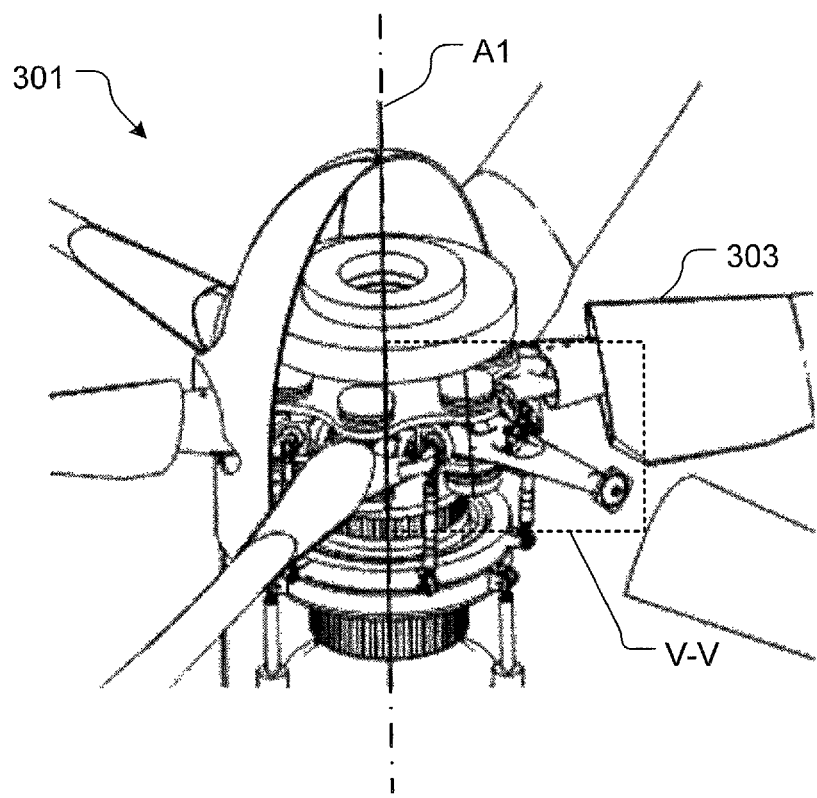
FIG. 4 is an enlarged view of the rotor hub assembly of FIG. 3.
Figure 5:
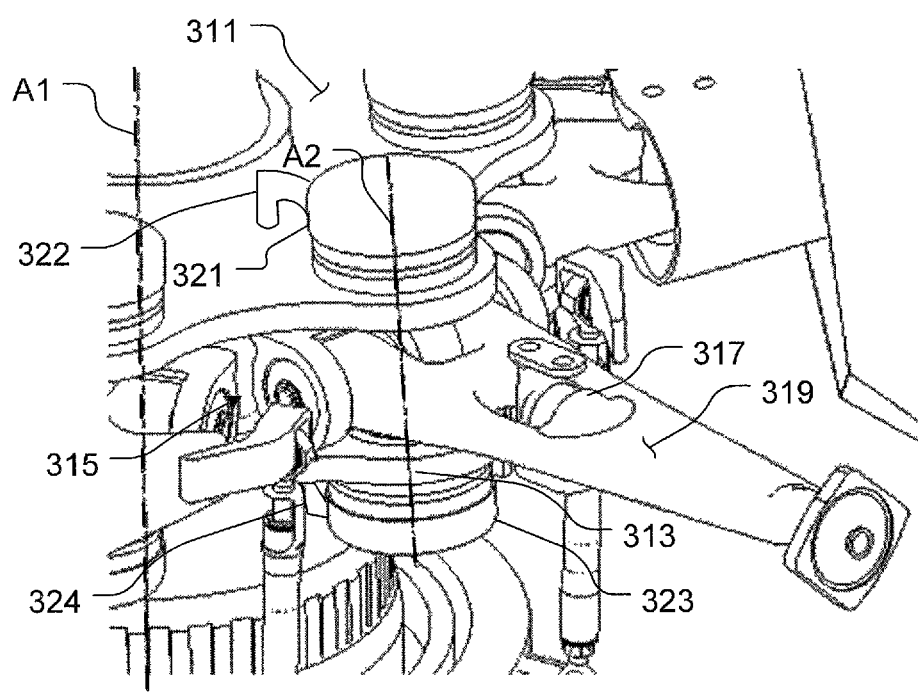
FIG. 5 is an enlarged view of the rotor hub assembly of FIG. 4 taken at V-V.

Referring now to FIGS. 4 and 5 in the drawings, enlarged oblique views of rotor hub assembly 301 are shown. FIG. 5 is an enlarged view of FIG. 4 taken at V-V and illustrated with some of the components of rotor hub assembly 301 removed for clarity.

Swashplate 305 preferably comprises an upper driver plate 311 and a lower driver plate 313, both driver plates being utilized to rotate blades 303. An attachment device 315 is selectively placed between the two driver plates and is configured to pivotally and rotatably couple rotor blades 303 to swashplate 305. In the preferred embodiment, attachment device 315 is a trunnion formed in a T-shaped configuration.

Attachment device 315 provides both rotational and pivoting means for rotor blades 303 to slightly rotate in a direction relative to axis A2 due to lead/lag forces created by the rotor blades during flight and to slightly pivot in a direction relative to axis A3 due to flapping of the rotor blades during flight. In the preferred embodiment, swashplate 305 includes a first port (not shown) extending through the thickness of the upper plate and a second port (not shown) extending through the thickness of the lower plate. Both ports are configured to receive distal ends of the attachment device. The ports are preferably circular in shape, thus allowing rotational movement of the attachment device along axis A2 in direction D1, as indicated with an arrow.

The preferred embodiment utilizes a swashplate having two driver plates and circular ports to allow rotational movement of the attachment device. However, it should be appreciated that alternative means for rotating the trunnion relative to the swashplate could be utilized in lieu of the preferred embodiment. For example, the swashplate could include a single driver plate operably associated with a rotatable hinge assembly for coupling the rotor blades to the swashplate. However, it will be appreciated that the preferred embodiment provides significant advantageous, including added support and rigidity.

Rotor hub assembly 301 further comprises a centrifugal bearing 317 (hereinafter referred to as a "C.F. bearing") carried by a rotor yoke arm 319 and one or more dual spring-rate dampers operably associated with attachment device 315. In the preferred embodiment, the C.F. bearing is configured to control centrifugal load created by the rotor blades, while the dual spring-rate damper is configured to selectively control lead-lag movement created by the rotor blades during flight.

In the exemplary embodiment, rotor hub assembly 301 includes two dual spring-rate dampers: a first damper 321 securely fastened to upper plate 311 via an upper arm 322 and a second damper 323 securely fastened to lower plate 313 via a lower arm 324. The dual spring-rate dampers selectively transition between a first spring rate and a second spring rate during flight. For example, the dampers are configured to provide both rigid and soft damping ratios. This feature is particularly desired for use with tiltrotor aircraft because the damper switches from a locked configuration, thus creating a stiff hub assembly during airplane mode, to an unlocked configuration, which creates a softer hub assembly during helicopter mode. In some embodiments, the stiff-in-plane configuration is generally required in airplane mode for stability above approxmatly 160 knots and in helicopter mode to avoid ground resonance issues due to wing and pylon frequencies.

It should be understood that the flapping motion is minimized in airplane mode by using a full authority flap controller (not shown) that actively tilts the swashplate to limit the flapping to no more than 8 degrees. The flapping needs to be minimized to minimize rotor loads that are proportional to flapping in the stiff configuration. The soft-in-plane configuration is needed in helicopter mode to lower the hub loads which occur during high flapping for maneuvering in helicopter mode. Loads in articulated mode at limit flapping are much lower than in the rigid mode. Peak flapping is usually at high speed helicopter operation.

Figure 6:
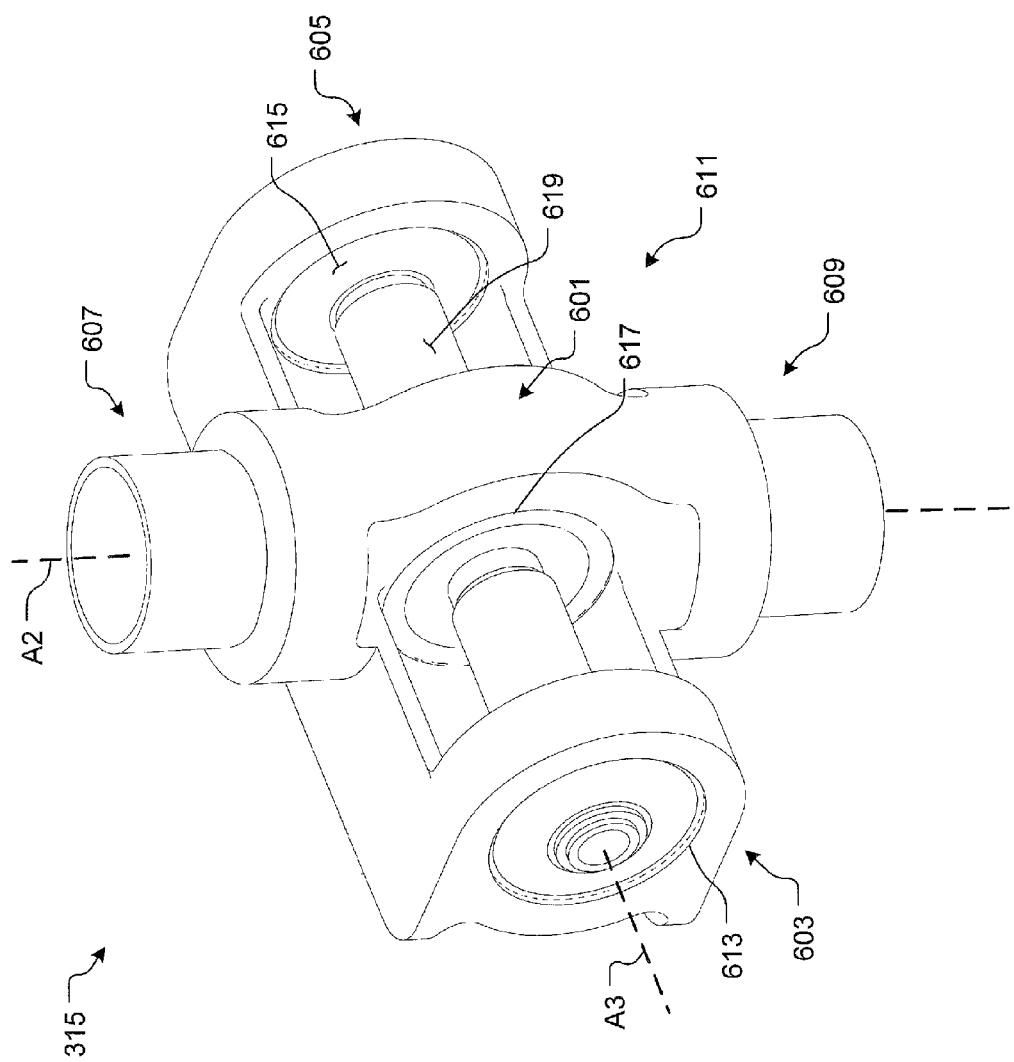
FIG. 6 is an enlarged view of an attachment device of the rotor hub assembly of FIG. 4.

FIG. 6 shows an oblique view of attachment device 315. In the preferred embodiment, attachment device 315 is manufactured in a T-shaped configuration having a longitudinal body 601 extending relatively normal to two lateral arms 603 and 605. Body 601 includes two opposing ending configured to rotatably couple to the swashplate: a first ending 607 configured to couple with the port extending through upper plate 311 and a second distal ending 609 configured to couple with the port extending through lower plate 313. The first and second endings provide rotational means for attachment device 315 to rotate relative to swashplate 305. As is shown, the first and second distal endings are preferably circular shaft members configured to extend through and couple to the ports of the upper and lower driver plates. It should be appreciated that elastomeric material could be placed between the endings and the ports to provide slight elastic rotational movement of the attachment device 315 relative to the driver plates.

Attachment device 315 comprises a bearing system 611 having at least three bearings: a first bearing 613 carried by lateral arm 603, a second bearing 615 carried by lateral arm 605, and a third bearing 617 disposed within body 601. Bearing system 611 accomidates flapping, feathering and lead-lag motions while reacting C.F. forces and hub shear forces. The bearing system provides a rigid attachment to the rotor mast (not shown) for all flight modes while allowing flapping and feathering motion. In the preferred embodiment, bearings 613 and 615 are journal bearings, while bearing 617 is a spherical bearing. All three bearings are coaxially aligned along axis A3 and configured to receive a shaft 619. Shaft 619 provides rotational means for allowing pivoting movement of yoke arm 319 relative to attachment device 315. When assembled, yoke arm 319 pivotally couples to attachment device 315 via shaft 619, thus enabling flapping motion of the rotor blades relative to the hub assembly.

Figure 7:
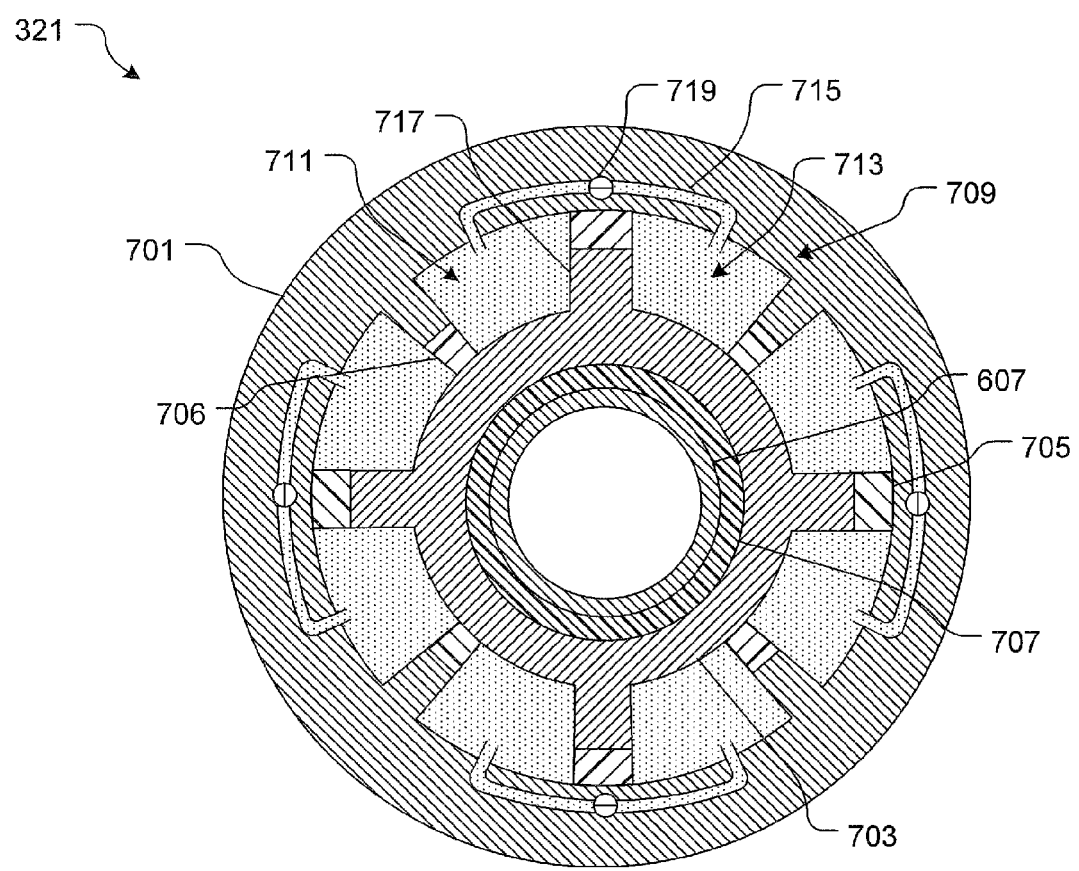
FIG. 7 is a cross-sectional top view of a dual spring-rate damper of the rotor hub assembly of FIG. 4.

Referring next to FIG. 7, a cross-sectional top inner view of damper 321 is shown. For ease of description, a detailed disclosure of one of the two dampers, damper 321, is shown and described below. However, it should be understood that the damper 323 includes all of the features of damper 321.

As previously discussed, the two dual spring-rate dampers are configured to selectively switch between a first spring rate and a second spring rate during flight. The first spring rate is created via a plurality of elastomeric members selectively positioned within the damper, which create a desired shear resistance as a rotational force is exerted thereto. It will be appreciated that the elastomeric properties of the elastomeric materials can be selectively tailored to create a desired shear resistance, depending on the preferred application. The second spring rate is created with the plurality of elastomeric members in conjunction with fluid passing between two fluid reservoirs disposed within the damper. Further illustration and description of these features are provided below.

Damper 321 comprises a non-rotational outer housing 701 rigidly attached to the upper driver plate via arm 322. Outer housing 701 receives the elastomeric members and one or more fluid chambers for creating the dual spring rates. In the exemplary embodiment, damper 321 includes four fluid chambers for creating a desired damping effect; however, alternative embodiments could include more of less fluid chambers, depending on the preferred application. The fluid used in the preferred embodiment is an incompressible fluid, for example, hydraulic fluid, oil, and/or an alternative suitable fluid.

Damper 321 further includes an inner housing 703 rotatably coupled to outer housing 701 via a plurality of elastomeric seals 705 and 706. Ending 607 of attachment device 315 couples to inner housing 703 via an elastomeric seal 707 disposed therebetween. The elastomeric seals create a first spring rate as attachment device 315 exerts a rotational movement relative to damper 321.

In the preferred embodiment, four fluidly sealed chambers 709 are created between the two housings. The chambers are configured to create a second spring rate, as is further discussed in detail below. For ease of description, one of the four chambers is discussed in detail; however, it should be understood that all four chambers are similar in form and function.

Chamber 709 comprises at least two reservoirs: a first reservoir 711 and a second adjacent reservoir 713, both reservoirs being in fluid communication with each other via a conduit 715. In the exemplary embodiment, a vane 717 elastically attached to housing 701 separates the two fluid reservoirs. It should be appreciated that conduit 715 could pass through vane 717 in alternative embodiments.

During operation vane 717 moves within the reservoirs, thus causing fluid exchange therebetween. A valve 719 restricts fluid access through conduit 715. When closed, the fluid is restricted from traveling through the conduit and the vane is prevented from moving within the fluid reservoirs. In this scenario, the damping effect is created solely from the elastomeric seals disposed within the damper. When opened, the fluid passes through the two reservoirs and the vane is allowed movement within the Specification reservoirs. This scenario creates a second spring rate, a softer damping, as fluid is exchanged between the reservoirs.

In the preferred embodiment, valve 719 is configured to completely open and close access through conduit 715; however, it will be appreciated that alternative embodiments could include a valve that allows selective flow rates through conduit 715. For example, a ball valve or a sliding valve could be utilized in lieu of a valve that completely transitions between an opened and closed position.

Controlling the opening and closing of valve 719 is achieved with one or more manual controls carried in the fuselage and/or autonomously controlled by the aircraft control system. For example, in flight conditions when a softer damping effect is desired, valve 719 allows fluid to pass through conduit 715 merely by manipulating a control switch (not shown), and likewise, when a stiffer damping effect is desired, valve 719 can restrict fluid passing through conduit 715 by manipulating the same switch, which can either be manually or autonomously controlled. The opening and closing of valve 719 can be accomplished by hydraulic, electrical, or mechanical means.

In the preferred embodiment, elastomeric seals 705 are preferably manufactured as "sandwich" structures, with alternating layers of an elastomeric material and a rigid, non-elastomeric material, such as a metal. This type of structure is nearly incompressible in a direction generally normal to the layers, while allowing for a predetermined amount of shearing motion.

Figure 8:
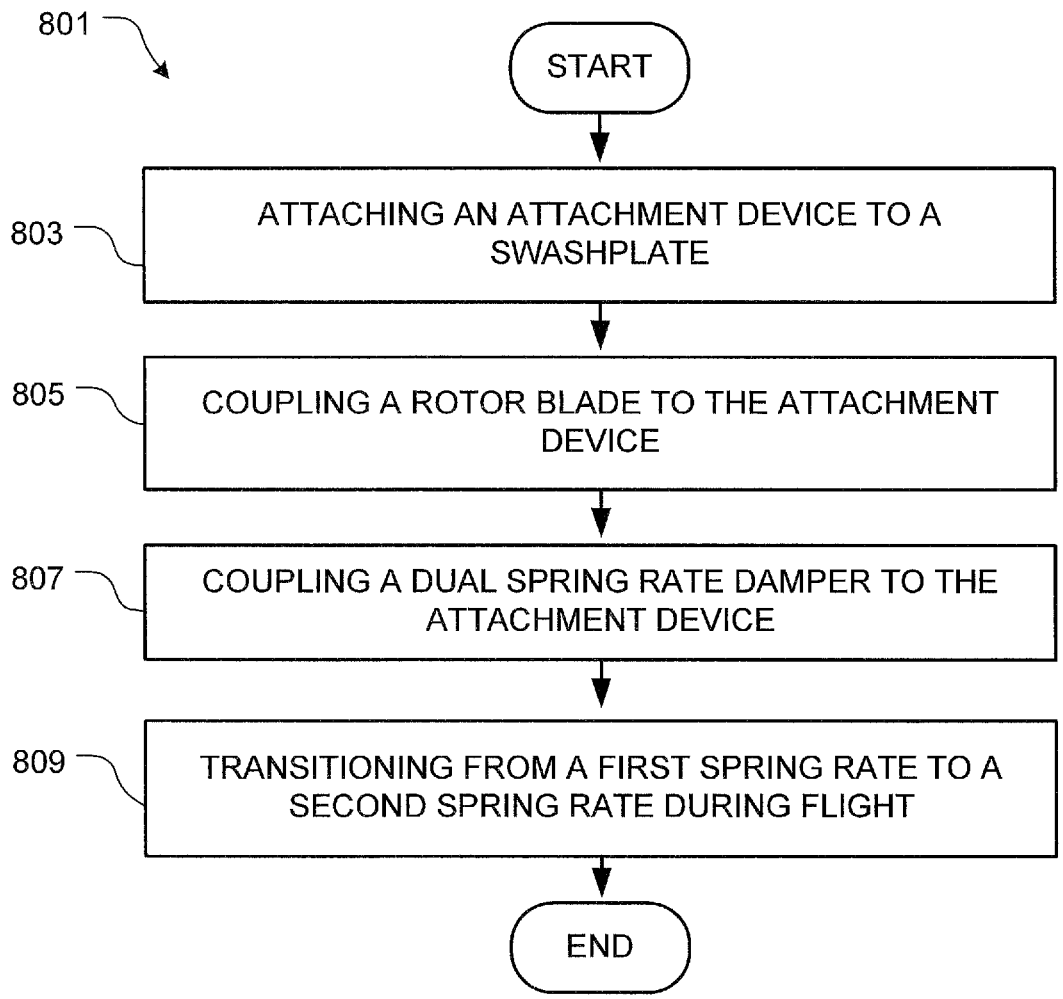
FIG. 8 is a flow chart depicting the preferred method.

Referring to FIG. 8 in the drawings, a flowchart 801 depicting the preferred method is shown. Box 803 depicts attaching an attachment device to a swashplate. The attachment device provides pivot and rotational movement of a rotor blade attached thereto, as depicted in box 805. Next, a dual spring rate damper is coupled to the attachment device, as depicted in box 807. Lastly, box 809 depicts transitioning between the first spring rate and the second spring rate during flight.

It is apparent that an assembly and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:
1. A rotor hub assembly for a rotary aircraft, comprising:
   a swashplate;

an attachment device rotatably coupled to the swashplate and pivotally coupled to a rotor blade;
a first damper operably associated with the attachment device configured to dampen forces exert by the rotor blade during flight, the first damper comprising:
   a fluidly sealed chamber having:
      a first fluid reservoir;
      a second fluid reservoir; and
      a conduit in fluid communication with the first reservoir and the second reservoir
   a valve in fluid communication with the conduit, the valve being configured to restrict fluid passage between the first fluid reservoir and the second fluid reservoir
   an elastomeric seal configured to elastically resist rotational movement of the attachment device relative to the swashplate;
   wherein a first spring rate is created by the elastic resistance from the elastomeric seal as the fluid is restricted from channeling through the conduit; and
   wherein a second spring rate is created by the elastic resistance from the elastomeric seal and the fluid passing between the first fluid reservoir and the second reservoir; and
a second damper operably associated with the attachment device and configured to dampen forces from the rotor blade.

2. The rotor hub assembly of claim 1, further comprising:
a centrifugal bearing operably associated with the rotor blade;
wherein the centrifugal bearing is configured to dampen centrifugal forces from the rotor blade.

3. The rotor hub assembly of claim 1, the swashplate comprising:
an upper driver plate; and
a lower driver plate;
wherein the attachment device is position between the upper driver plate and the lower driver plate; and
wherein the attachment device rotatably attaches to upper driver plate and the lower driver plate.

4. The rotor hub assembly of claim 1, the attachment device comprising:
a bearing system carried by the attachment device and configured to pivotally attach the rotor blade to the attachment device.

5. The rotor hub assembly of claim 4, the bearing system comprising:
a shaft; and
a bearing configured to receive the shaft;
wherein the rotor blade couples to the shaft and pivots relative to the attachment device via the bearing.

6. The rotor hub assembly of claim 1, the attachment device comprising:
a longitudinal body;
a first arm and a second arm, both arms being attached to and extending from the longitudinal body;
a bearing system carried by the first arm and the second arm; and
a shaft rotatably supported by the first arm and the second arm via the bearing system;
wherein the rotor blade couples to the shaft and pivots relative to the attachment device via the bearing system.

7. The rotor hub assembly of claim 6, the swashplate comprising:
an upper driver plate; and
a lower driver plate;
wherein the longitudinal body rotatably attaches to the upper driver plate and the lower driver plate.

8. A method, comprising:
rotatably attaching an attachment device to a swashplate, the attachment device being configured to rotate relative to the swashplate;
pivotally attaching a rotor blade to the attachment device, the rotor blade being configured to pivot relative to the attachment device;
damping the rotational movement of the attachment device with a first damper and a second damper; and
switching the damping effects of the first damper and the second damper between a first spring rate and a second spring rate during flight.

9. The method of claim 8, wherein switching the spring rate is achieved by controlling fluid passage between two fluid reservoirs disposed within the damper.

10. The method of claim 9, wherein damping the rotational movement is achieved by elastomeric material disposed within the first damper and the second damper.

* * * * *